United States Patent
Ladwig

(10) Patent No.: US 11,270,153 B2
(45) Date of Patent: Mar. 8, 2022

(54) SYSTEM AND METHOD FOR WHOLE WORD CONVERSION OF TEXT IN IMAGE

(71) Applicant: NORTHROP GRUMMAN SYSTEMS CORPORATION, Falls Church, VA (US)

(72) Inventor: Michael D. Ladwig, Palm Springs, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 16/794,886

(22) Filed: Feb. 19, 2020

(65) Prior Publication Data
US 2021/0256294 A1    Aug. 19, 2021

(51) Int. Cl.
G06K 9/62      (2006.01)
G06T 7/10      (2017.01)
G06K 9/46      (2006.01)

(52) U.S. Cl.
CPC ............ *G06K 9/6202* (2013.01); *G06K 9/46* (2013.01); *G06T 7/10* (2017.01); *G06K 2209/01* (2013.01)

(58) Field of Classification Search
CPC .... G06K 9/6202; G06K 9/46; G06K 2209/01; G06K 9/00; G06K 9/36; G06T 7/10
See application file for complete search history.

(56) References Cited

U.S. PATENT DOCUMENTS

| | | | |
|---|---|---|---|
| 5,313,527 A * | 5/1994 | Guberman | G06K 9/00859 382/186 |
| 6,741,743 B2 | 5/2004 | Stalcup et al. | |
| 7,499,588 B2 | 3/2009 | Jacobs et al. | |
| 7,574,050 B2 | 8/2009 | Ladwig et al. | |
| 7,706,611 B2 * | 4/2010 | King | G06F 16/332 382/181 |

(Continued)

FOREIGN PATENT DOCUMENTS

| | | | | |
|---|---|---|---|---|
| EP | 0425291 A2 * | 5/1991 | | G06K 9/723 |
| WO | 2008138356 | 11/2008 | | |

OTHER PUBLICATIONS

Translated EP 042591 from EP Office (Year: 1990).*

(Continued)

*Primary Examiner* — Nancy Bitar
(74) *Attorney, Agent, or Firm* — Katten Muchin Rosenman LLP

(57) ABSTRACT

The disclosed invention provides system and method for whole word conversion of text in an image. The system and method may convert the text in the image into Unicode strings. The system and method utilizes comparable features of word segments that are extracted from the text in the image. The comparable features of the word segments are created by mirroring comparable features of word templates stored in a conversion database. Word templates in the database are filtered by comparing the comparable features of the word segments with comparable features of the word templates in the database. The word segments are correlated to matching word candidates. Word confusion networks are constructed with the matching word candidates, and the word confusion networks are evaluated to output matching words for the word segments. This system and method reduce the search space in the database improving search efficiency.

18 Claims, 10 Drawing Sheets

(56) References Cited

U.S. PATENT DOCUMENTS

| | | | |
|---|---|---|---|
| 8,014,604 B2 | 9/2011 | Tzadok et al. | |
| 8,077,973 B2 | 12/2011 | Dong | |
| 8,131,085 B2 | 3/2012 | Vincent et al. | |
| 8,345,978 B2 | 1/2013 | Uzelac et al. | |
| 8,401,293 B2 | 3/2013 | Antonijemo et al. | |
| 8,548,246 B2 | 10/2013 | Al-Omari et al. | |
| 9,245,205 B1 | 1/2016 | Soldevila | |
| 9,501,708 B1 | 11/2016 | Ahmad et al. | |
| 2004/0220898 A1* | 11/2004 | Eguchi | G06F 16/5854 |
| 2009/0324107 A1* | 12/2009 | Walch | G06K 9/00872 382/224 |
| 2010/0008581 A1* | 1/2010 | Bressan | G06K 9/00859 382/177 |
| 2011/0224036 A1* | 9/2011 | Bohm | B62M 9/126 474/80 |
| 2014/0278357 A1 | 9/2014 | Horton | |
| 2017/0035166 A1* | 2/2017 | Zondervan | A45C 11/00 |
| 2017/0139984 A1 | 5/2017 | Bordawekar | |
| 2021/0200937 A1* | 7/2021 | Wheaton | G06F 40/169 |

OTHER PUBLICATIONS

Pro Quest Search History (Year: 2021).*

N.H. Khan and A. Adnan, "Urdu Optical Character Recognition Systems: Present Contributions and Future Directions," in IEEE Access, vol. 6, pp. 46019-46046, 2018. doi:10.1109/ACCESS.2018. 2865532. Retrieved on Jun. 18, 2019 from http://ieeexplore.ieee.org/stamp/stamp.jsp?tp=&arnurnber=8438450&isnumber=8274985.

S. Naz, et al., The optical character recognition of Urdu-like cursive scripts, Pattern Recognition (2013), http://dx.doi.org/10.1016/j.patcog.2013.09.037i. Retrieved on Jun. 18, 2018 from http://citeseerx.ist.psu.edu/viewdoc/download?doi=10.1.1.401.8990&rep=rep1&type=pdf.

Dalitz, Christoph, Georgios K. Michalakis, and Chistine Pranzas. "Optical recognition of psaltic byzantine chant notation." International Journal of Document Analysis and Recognition (IJDAR) 11.3 (2008): 143-158. Accessed on Jun. 14, 2019 from https://doi.org/10.1007/s10032-008-0074-4.

Aithal, Prakash K., et al., "A Fast and Novel Skew Estimation Approach using Radon Transform," International Journal of Computer Information Systems and Industrial Management Applications 5 (2013): 337-344.

Duda, R. O. and P. E. Hart, "Use of the Hough Transformation to Detect Lines and Curves in Pictures," Comm. ACM, vol. 15, pp. 11-15 (Jan. 1972).

Nobuyuki Otsu, "A Threshold Selection Method From Grey-Level Histograms," IEEE Transactions on Systems, Man and Cybernetics (vol. 9, Issue 1, Jan. 1979).

Adam Pauls and Dan Klein. 2011, "Faster and smaller n-gram language models," In Proceedings of ACL, Portland, Oregon, pp. 258-267.

\* cited by examiner

FIG. 2B

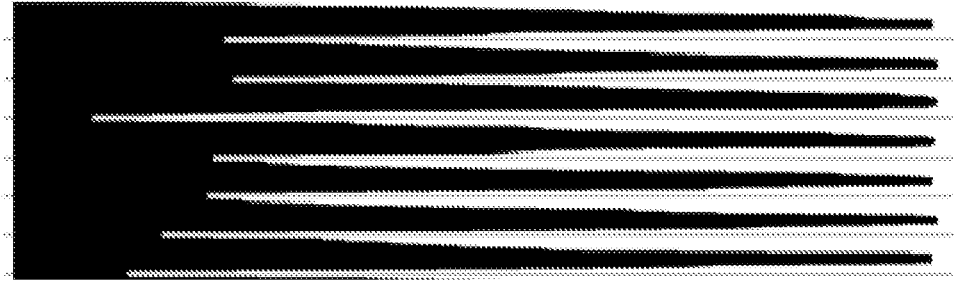

FIG. 2C

Ro Gwang-chol, vice-chief of the general staff of the army.

FIG. 3A

Ro Gwang-chol, vice-chief of the general staff of the army,

FIG. 3B

Ro Gwang-chol, vice-chief of the general staff of the army,

FIG. 3C

SYSTEM AND METHOD FOR WHOLE WORD CONVERSION OF TEXT IN IMAGE

BACKGROUND

Document images may contain information in a variety of languages. The contents of the document images are images that are not recognized as language characters. Organization may need to extract information from the document images. However, the document images are not able to be searchable by using typical information retrieval techniques. In order to solve this issue, document image-to-text technologies have been developed for a variety of languages. However, the document image-to-text techniques for script-based languages such as Arabic, Persian, Pashto, Urdu, and Thai have been challenges. For example, an image-to-text technique that can be used for Arabic language may not be applicable for other script-based language such as Persian, Urdu, Pashto, or Hindi. Known image-to-text techniques for the script-based languages often produce inaccurate output due to their inability to utilize accurate image comparison techniques at acceptable performance levels.

One of the image-to-text techniques, optical word recognition (OWR), is described in U.S. Pat. No. 6,741,743 ("the '743 patent") and U.S. Pat. No. 7,574,050 ("the '050 patent"). OWR technology applies an optical correlation approach to the analysis of text and other information in imaged documents. OWR provides an analysis capability that to date has primarily been used for language identification, logo detection, and signature identification in imaged documents. The concept, general approach, and challenges of OWR are described in the '050 patent.

In the descriptions, elements of the existing approach as described in the patents mentioned above will be referred to as OWR, and elements of the disclosed invention will be described as optical word conversion (OWC). One significant advantage that the OWC-based approach has over other techniques is that the OWC technique is based on machine learning techniques. The development of each additional language will not require significant effort beyond that needed for the first structurally similar language, making maximum use of data-driven machine learning techniques.

Although the development and testing work done here focuses on English and Pashto, there was great care taken to prevent language-specific elements from shaping key elements of the OWC approach. Beyond the fully automated machine learning database construction process, the language-specific adaptation, which must be made such as punctuation convention specification, selection of relevant fonts, is minimal.

SUMMARY

The disclosed invention provides system and method for whole word conversion of text in an image. The novel techniques of the disclosed invention utilizes whole word image comparison with word templates in a conversion database to produce more accurate conversion of text in an image into Unicode strings. Moreover, filtering a search space before the comparison allows extensive unsegmented whole word comparisons to be performed in a reasonable amount of time, improving search efficiency.

These and other advantages may be provided by, for example, a method for whole word conversion of text in an image. The method includes steps of performing line segmentation on the text in the image to identify clusters with each cluster sharing horizontal orientations, performing word segmentation on the identified clusters to produce word segments from the clusters, creating one or more comparable features of the word segments, performing whole word conversion of the word segments to matching word candidates based on the word segments, the comparable features of the word segments, and word templates stored in a conversion database, constructing word confusion networks with the matching word candidates, and evaluating the word confusion networks to output matching words for the word segments.

The one or more comparable features may include one or more of rendering vertical size, rendering horizontal size, pixel energy in the rendering image of a word segment, pixel energy summed horizontally, or pixel energy summed vertically. The one or more comparable features of the word segments may be created by mirroring comparable features of the word templates stored in the conversion database. The performing whole word conversion may include filtering the word templates to reduce a search space within the conversion database. The performing whole word conversion may include setting one of the word segments as a target, comparing the comparable features of the target with comparable features of the word templates stored in the conversion database, filtering the word templates based on the comparison, and performing image comparison with the filtered word templates.

The performing image comparison may include placing the target and a template from the filtered word templates in mirror orientations to each other, normalizing the target and the template in size in a spatial domain, forward transforming the target and the template into frequency domain, generating a product by multiplying the forward transformed target and template in the frequency domain, inverse transforming the product back to the spatial domain, and analyzing the inverse transformed product in the spatial domain to determine correlation between the target and the template. The performing whole word conversion may include evaluating the matching word candidates with scores. The constructing word confusion networks may include creating alternative paths with the matching word candidates that have the scores higher than a predetermined value. The matching word candidates may be represented by Unicode strings. The database may include comparable features of the word templates, and the word templates may represent words discovered in a language. The method may further include performing sub-word segmentation on the word segments to identify characters in the word segments. The method may further include constructing or updating the conversion database that includes word templates representing words discovered in a language. The conversion database may be constructed or updated by using a machine learning technique, and comparable features of the word templates may be created and stored in the conversion database.

These and others advantages may be also provided by, for example, a system for whole word conversion of text in an image. The system may be coupled to a conversion database that includes word templates and comparable features of the word templates. The word templates may represent words discovered in a language. The system includes at least one non-transitory storage medium to store executable instructions, and at least one processor to execute the executable instructions that cause the at least one processor to perform operations. The operations include performing line segmentation on the text in the image to identify clusters with each cluster sharing horizontal orientations, performing word segmentation on the identified clusters to produce word segments from the clusters, creating one or more comparable features of the word segments, performing whole word conversion of the word segments to matching word candidates based on the word segments, the comparable features of the word segments, and the word templates stored in the conversion database, constructing word confusion networks with the matching word candidates, and evaluating the word confusion networks to output matching words for the word segments.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2A shows an example of a text sample in an image.

FIG. 2B shows result of the Hough transform of the text sample shown in FIG. 2A.

FIG. 2C shows processes for enhancing the segregation of the line objects.

FIG. 3A shows a sample text for word segmentation.

FIG. 3B shows a result of Hough transform of the sample text shown in FIG. 3A.

FIG. 3C shows a result of connected element analysis of the text using Hough transform.

DETAILED DESCRIPTIONS

Figure 1A:
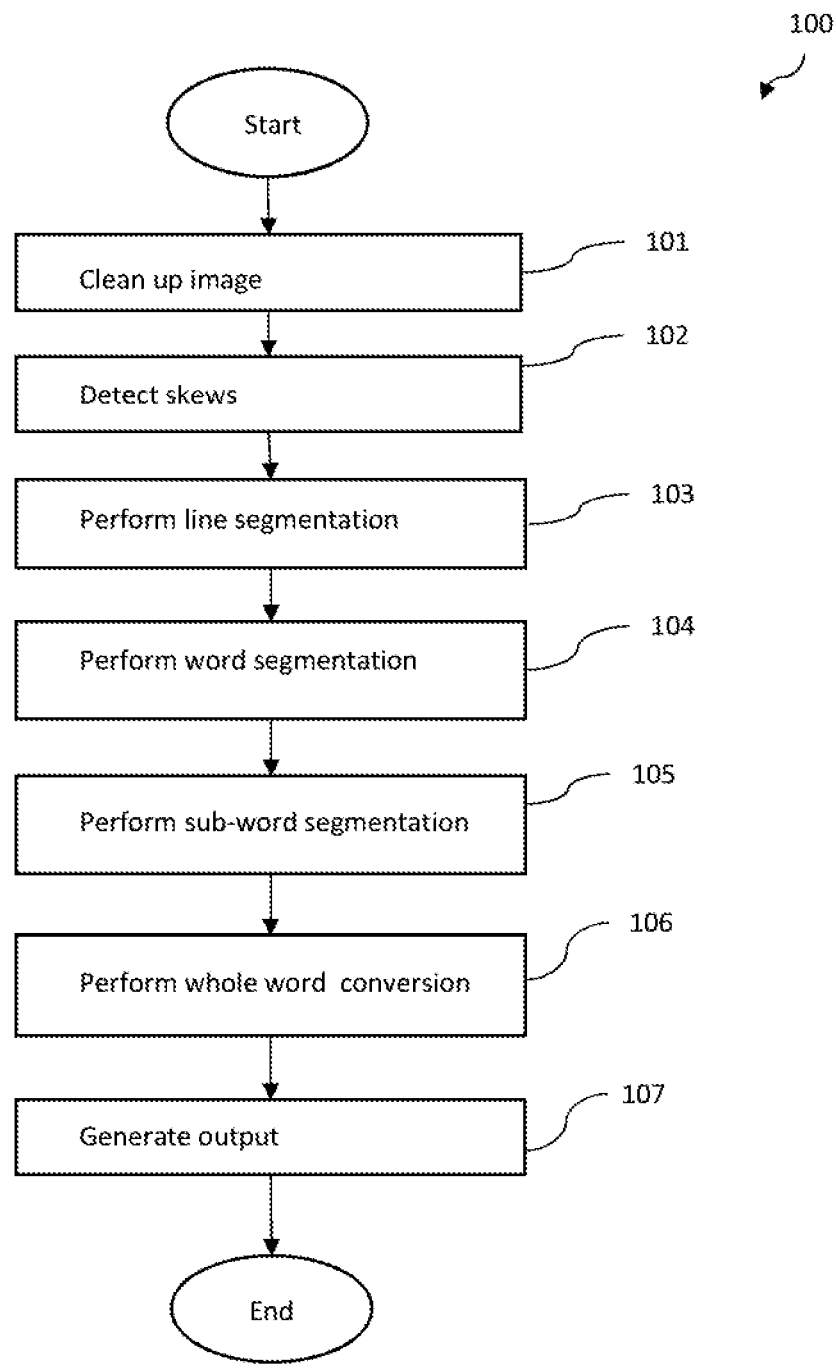
FIG. 1A shows a workflow diagram of a method of the disclosed invention for whole word conversion of text in an image.

It is to be understood that the figures and descriptions of the present invention may have been simplified to illustrate elements that are relevant for a clear understanding of the present invention. It is also to be understood that the drawings included herewith only provide diagrammatic representations of the presently preferred structures of the present invention and that structures falling within the scope of the present invention may include structures different than those shown in the drawings. It is also to be understood that the invention is not limited in its applications to the details of the particular arrangements shown since the invention is capable of other embodiments. Also, the terminology used herein is for the purpose of description and not of limitation. In the Summary above and in the Detailed Descriptions and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

With reference to FIG. 1A, shown is a workflow of a method of the disclosed invention for whole word recognition of text in an image. The steps of the method 100 include processes of cleaning image, block 101, detecting skew, block 102, performing line segmentation, block 103, performing word segmentation, block 104, performing sub-word segmentation, block 105, performing whole word conversion, block 106, and generating output, block 107.

Referring to cleaning image 101, the image, which includes texts to be converted, is normalized to a binary form using Otsu's method. See Nobuyuki Otsu, "A Threshold Selection Method From Grey-Level Histograms," IEEE Transactions on Systems, Man and Cybernetics (Volume: 9, Issue 1, January 1979). After the normalization, the image is cleaned up or despeckled using a technique of identifying small connected elements below the threshold of the small features in text such as the dot above a lowercase T. Finally, the edges of the image, where there is almost always a certain amount of noise from scan artifacts, are cleaned.

Referring to detecting skew 102, previous versions of OWR used two algorithms for document skew detection: one based on horizontal projection histograms, and the other based on a discrete Fourier transform. OWC technique of the disclosed invention adds a new technique based on the radon transform. This technique of the random transform is described in Aithal, Prakash K., et al., "A Fast and Novel Skew Estimation Approach using Radon Transform," International Journal of Computer Information Systems and Industrial Management Applications 5 (2013): 337-344. This approach appears to be faster and slightly more accurate. It also appears significantly more resistant to errors caused by blurring, scan artifacts, and embedded non-text objects.

Referring to performing line segmentation 103, the line segmentation in OWC is based on the Hough transform that is a feature extraction technique for finding imperfect instances of objects. See Duda, R. O. and P. E. Hart, "Use of the Hough Transformation to Detect Lines and Curves in Pictures," Comm. ACM, Vol. 15, pp. 11-15 (January, 1972). The objects are located in a parameter space that allows them to vary in ways such as size, location, and orientation. FIG. 2A shows an example of a text sample in an image. Considering this text sample, OWC first uses a Hough transform to identify object clusters, with each cluster sharing a horizontal orientation and location. The result of the Hough transform is shown in FIG. 2B. Under ideal circumstances, the Hough line objects would be well segregated from each other and a connected element analysis would reveal the individual lines. This exemplary text, however, demonstrates extremely close line spacing causing the Hough objects to connect unrelated lines, which in turn would cause errors. In addition to close line spacing, a number of other common image conditions (e.g. fax and scan artifacts, artistic decoration) cause similar problems.

In order to enhance the segregation of these line objects, pixel energy is summed horizontally along the lines and median value is filtered. This value is used to identify minima that satisfy criteria for line breaks (segregation). The image in FIG. 2C depicts this process graphically along with the identified line breaks.

Referring to performing word segmentation 104, word segmentation is performed on the identified clusters, which are produced through the line segmentation, to produce word segment from the clusters. A Hough transform with a more vertical orientation used in the collection space is performed to connect word elements, and a connected element analysis is used to identify the individual words. This word segmentation is further refined through an analysis of median smoothed vertically summed pixel energy. A sample text line such as shown in FIG. 3A generates a Hough transform image as shown in FIG. 3B. A connected element analysis of the word using Hough transform produces the image as shown in FIG. 3C.

The image in FIG. 3C also illustrates a challenge associated with word segmentation: the irregularity of word spacing. Word spacing depends on each word's glyph forms in a specific font. The difficulty in separating "of" from "the" is significant compared to separating "the" and "army." In Latin character set languages, problematic combinations include anything where kerning algorithms generate atypical separation patterns, such as repeated '1' characters in "hill" that produce character separation characteristics similar to word spacing. These challenges exist in script based character sets but are much less common.

Referring to performing sub-word segmentation 105, starting with a word unit, sub-word segmentation performs a connected element analysis to identify individual character and character part elements. The horizontal bounds of the connected elements are analyzed to determine character and punctuation mark boundaries. A small degree of overlap between distinct characters is permitted to accommodate the blur/expansion of pixel energy inherent in the print and scan processes.

Referring to performing whole word conversion 106, each unknown word segment is compared against a static conversion database having word templates of known word images. Each of the known word image can be traced back to a Unicode string used to generate output matches for the overall conversion process. At system training time, a conversion database is created from a huge monolingual text corpus in the target language. This database is constructed using machine learning techniques and represents each unique word token discovered in the language. At current speeds, this database takes hundreds of hours of processing time to create. When all different word forms are considered, there are vast numbers of words that must be represented. The number varies depending on languages. For example, Arabic language has a few hundred thousand word stems (base words devoid of modifiers for information like tense, plurality, and gender), but would have several hundred million unique word forms since the OWC scheme requires separate entries for each word stem. Optionally, the conversion database may be updated, if necessary, to include more words and word stems through machine learning techniques.

Each word is represented in the conversion database with a primary key that is Unicode string representation. Each unique Unicode string is further processed using all desired fonts and font sizes to produce a set of bitmaps rendering their visual appearance. Each of these word rendering images is further described through a series of features, each generated using a different algorithm producing a comparable feature. Examples of these comparable features include rendering vertical size, rendering horizontal size, pixel energy (black pixels) in the rendering image, pixel energy summed horizontally, pixel energy summed vertically. These comparable features can be created and selected using a variety of machine learning techniques such as neural networks and genetic algorithms. Exemplary criteria for selecting a particular feature include speed of computation from a word image, speed of comparison against another feature, orthogonality of a given set of comparable features. This database and searches against the database can be advantageously split across a cluster of processing systems to provide parallelism and increase processing speed.

Figure 1B:
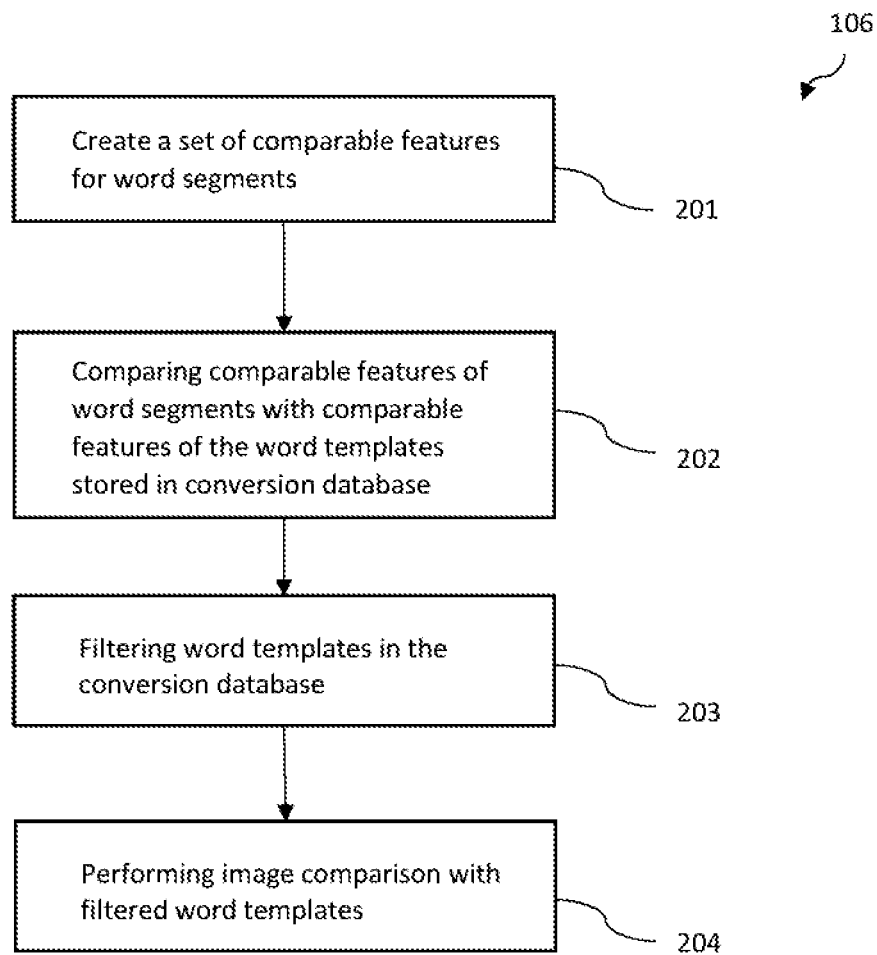
FIG. 1B shows a workflow diagram of whole word conversion processes of word segments.

With reference to FIG. 1B, shown is a workflow of the process of performing whole word conversion of word segments, block 106. The image correlation approach used in OWC is highly accurate, but is also a relatively expensive comparison. Given an unknown image of word segment and a database of several hundred million-match candidates, it may be necessary to reduce the search space within the conversion database so that the correlation comparison is performed on a relatively small number of high-quality candidate matches. In order to reduce the search space, for each unknown word image (word segment), OWC creates a set of comparable features of the word segments, block 201, mirroring comparable features that are computed during the construction of the conversion database of known word templates. The conversion database includes word templates of known words and the comparable features of the word templates. The word templates for search may be filtered based on the comparable features. Specifically, one of the word segments may be set as a target, and a set of comparable features of the target word segment may be created. This set of comparable features of the target mirrors the comparable features of the word templates stored in the conversion database, so that the comparable features of the word segments may be compared with corresponding comparable features of the word templates stored in the conversion database, block 202. Through this process, the word templates in the conversion database may be filtered based on the comparisons, block 203. These processes consequently reduce the size of the search space within the conversion database. This filtering or reduction process can be done serially or in parallel depending on the most efficient search size reduction strategy for a given result set. Once the word templates in the conversion database are filtered image comparison process is performed, block 204.

Because the images (word templates) of the known word in the database are created synthetically through a rendering process and not naturally in the normal course of the lifecycle of a hardcopy image (printing, usage, scanning), the correct match will not necessarily have the same values even for simplistic comparable features like size and energy. As a result, the upper/lower bound range determination for each feature in this filtering step has a significant effect. If the bound range is too wide, the comparison may be slow, and if the bound range is too narrow, the comparison may miss high-quality candidate word renderings.

Figure 1C:
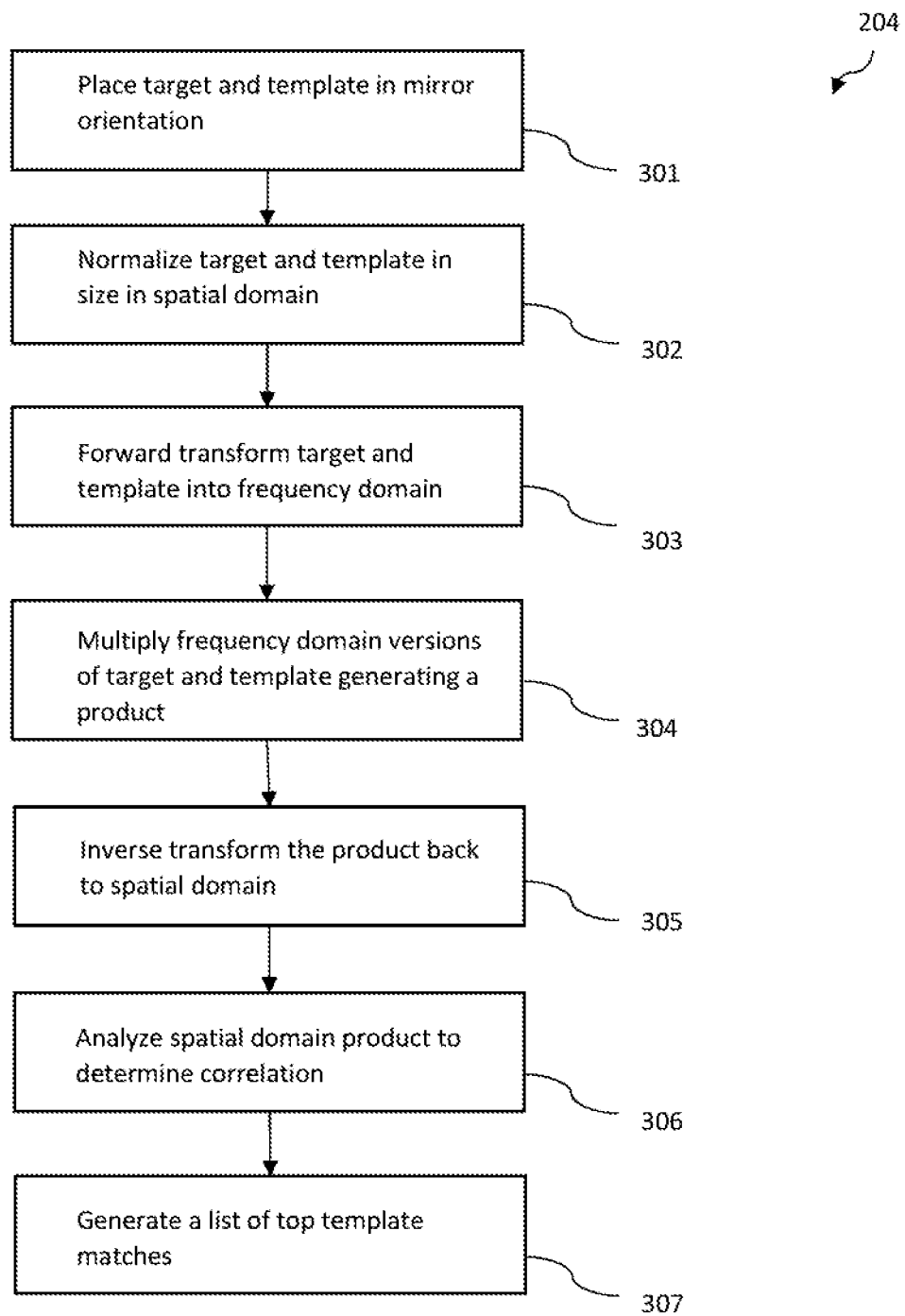
FIG. 1C shows a workflow diagram of image comparison processes.

With reference to FIG. 1C, shown is a workflow of the process of performing image comparison process, block 204. The image comparison process in OWC is similar to the target-to-template comparison disclosed in OWR. The word segment for the correlation is set as a target. The comparison between the target and word templates in the filtered search space of the database includes the following steps. The target and a word template in the filtered search space of the database are placed in mirror orientations to each other, block 301. The target and the template are normalized in size in a spatial domain, block 302. The target and the template are forward transformed into a frequency domain, block 303. The frequency domain versions of the target and template are multiplied, block 304, generating a product of the target and template in the frequency domain. The product in the frequency domain is inverse transformed back to the spatial domain, block 305. The spatial domain product is analyzed to determine correlation, block 306. The image comparison process produces a list of the top template matches for the word segment, block 307, along with the various correlation metrics generated by the comparison process. The top template matches may be evaluated with scores representing qualities of the correlations. These results are passed on to the output generation phase.

Figure 1D:
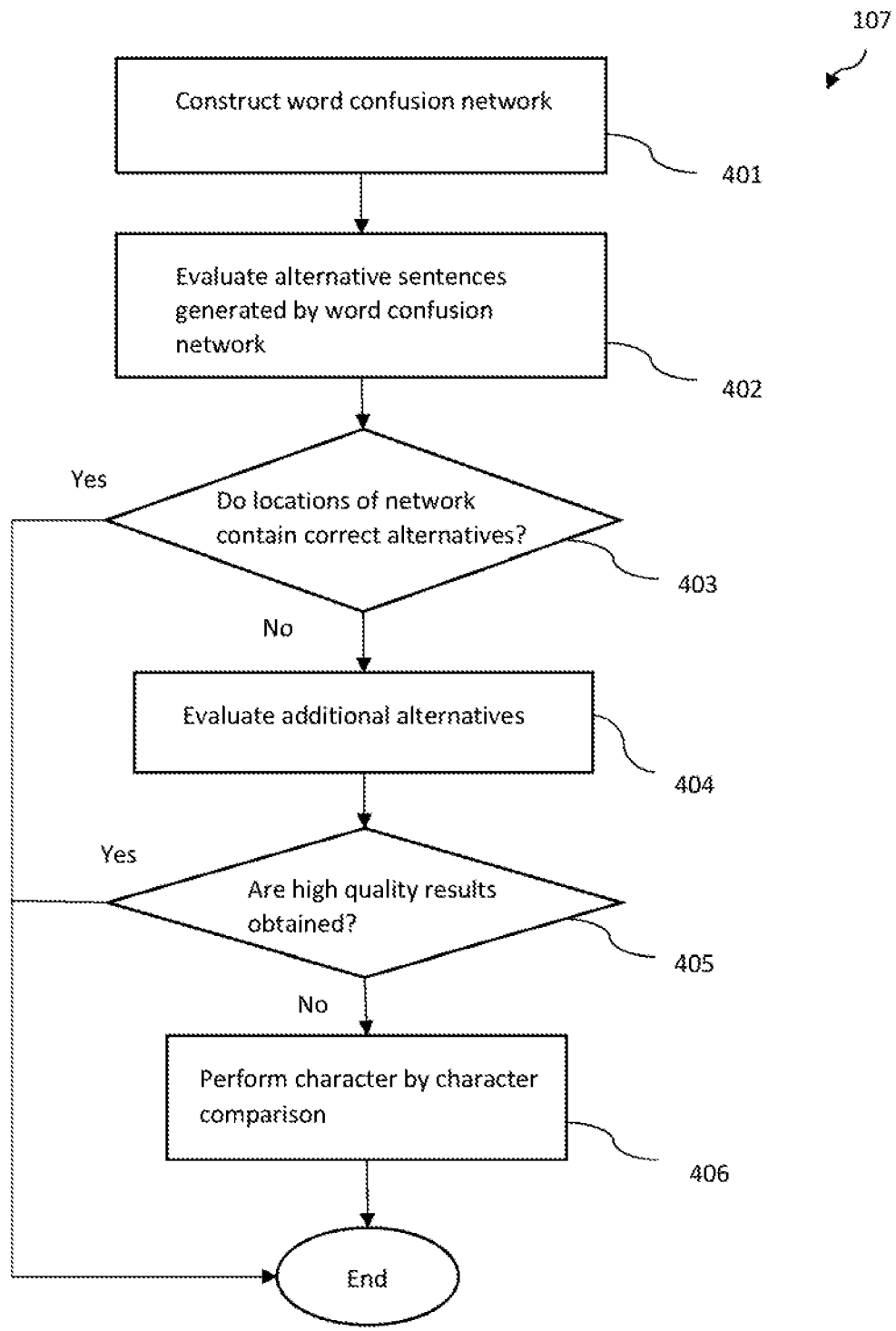
FIG. 1D shows a workflow diagram of output generation processes.

With reference to FIG. 1D, shown is a workflow of the process of generating output, block 107. Output generation process starts with construction of a word confusion network, block 401, for a sequence of image comparison results, typically a sentence. The word confusion network is made based on the highest quality image comparison result generated for each word segment, with alternatives based on other high scoring candidate words within a threshold range. For example, the alternative paths (sentences) may be created with matching word candidates among the template matches that have scores greater than a predetermined value. Each alternative sentence that could be generated by the word confusion network may be evaluated, block 402, for example by using a traditional n-gram language model. See Adam Pauls and Dan Klein. 2011, "Faster and smaller n-gram language models," In Proceedings of ACL, Portland, Oreg. The highest scoring path through the confusion network is used for the final output. However, during the word confusion network evaluation process, results could indicate that a specific location in the network does not contain the correct alternative. Therefore, it is examined whether locations (nodes) of the confusion network contain correct alternatives, block 403. If results indicate that a specific location in the network does not contain the correct alternative, additional alternatives from the original comparison may be evaluated, block 404. Should even this expanded search not produce a high-quality result, block 405, a segmented character-by-character comparison can be performed, block 406. Experimentally, this fallback measure is typically necessary only when handling atypically made-up words, non-language code sequences, or misspellings that may include intentional or non-intentional misspellings.

In order to evaluate the method of the whole word conversion of the disclosed invention, the OWC prototype was built and evaluated against text images written in two languages, Pashto and English. Each evaluation document was created by programmatically generating a Microsoft Word document using the Apache poor obfuscation implementation (POI) library along with an answer key for the document. Each page of the document has a number of lines, each consisting of a single sentence. This document was printed and the resulting paper copy was scanned to produce a bitmap image used as input to the image-to-text products. Two different evaluations were conducted for each language. The first evaluation focuses on core word recognition accuracy and does not contain punctuation. The second evaluation includes punctuation.

First, the evaluator normalizes Unicode values identical in appearance to a consistent value in both the answer key and the result text. The evaluation algorithm considers a token from the answer key, and attempts to match it against the next key in the result text. If it matches, pointers to the answer key and result text are incremented and the next evaluation is performed. If it does not, the error is tabulated and the parallel texts are searched for the shortest distance to a correct word alignment. Only wrong or missing words from the answer key are counted as incorrect results.

Results with Pashto language: a ten-page Pashto test document was used to compare OWC and a commercial product (CP1). The identical text content was analyzed using two fonts: Parsalai and Tahoma. These fonts are significantly different in visual appearance: Parsalai has a very traditional appearance, and Tahoma a streamlined, modern look.

The original intent was to evaluate performance on a line-by-line basis because this information is often helpful in accurately reconstructing sentence breaks. OWC, due to the way it implements structure analysis, is able to generate output exactly matching line breaks in the original image. The CP1 does not reliably generate output retaining these line breaks. In order to more fairly evaluate the CP1 core recognition accuracy, the output text from each page is concatenated into a single string and evaluated using the realigning algorithm discussed above.

Figure 4A:
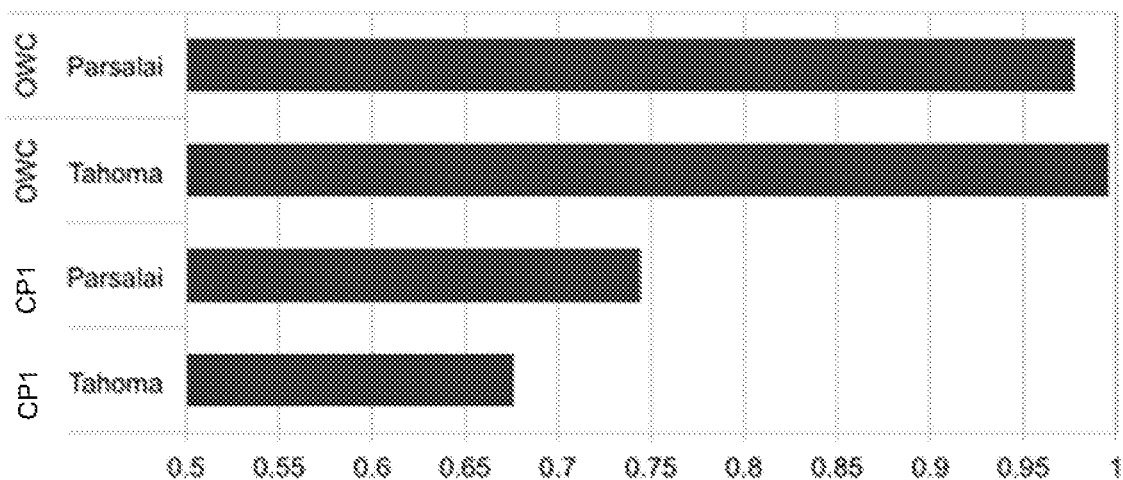
FIGS. 4A-4B show results comparing OWC with a commercial product in Pashto language for two fonts, Parsalai and Tahoma.
Figure 4B:
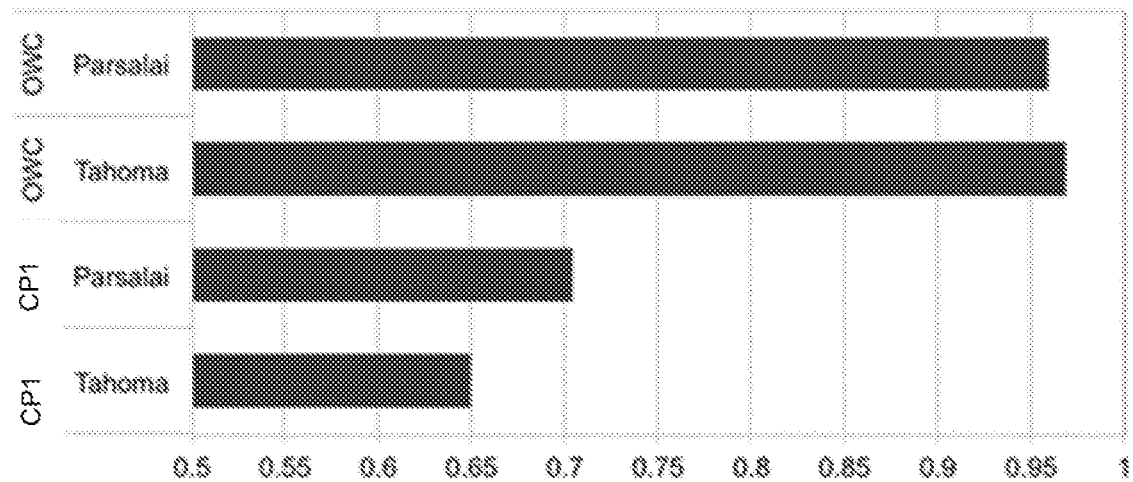

For both OWC and CP1, certain Unicode characters with identical appearance and meaning were normalized before performing the comparison. The charts in FIGS. 4A and 4B show the results comparing OWC with the CP1 for two fonts, Parsalai and Tahoma. On the horizontal line, '1' means high accuracy and '0' means poor accuracy. FIG. 4A shows the results of the core (without punctuation) conversion task rendered using two common fonts (Parsalai and Tahoma). FIG. 4B shows results for a standard (text that includes punctuation) conversion task. The OWC results are significantly better than the CP1 results for both ten-page tests. This is true for both fonts, and with or without punctuation. Interestingly, both OWC and the CP1 lost a similar amount of accuracy when punctuation was included in the test images.

Figure 5A:
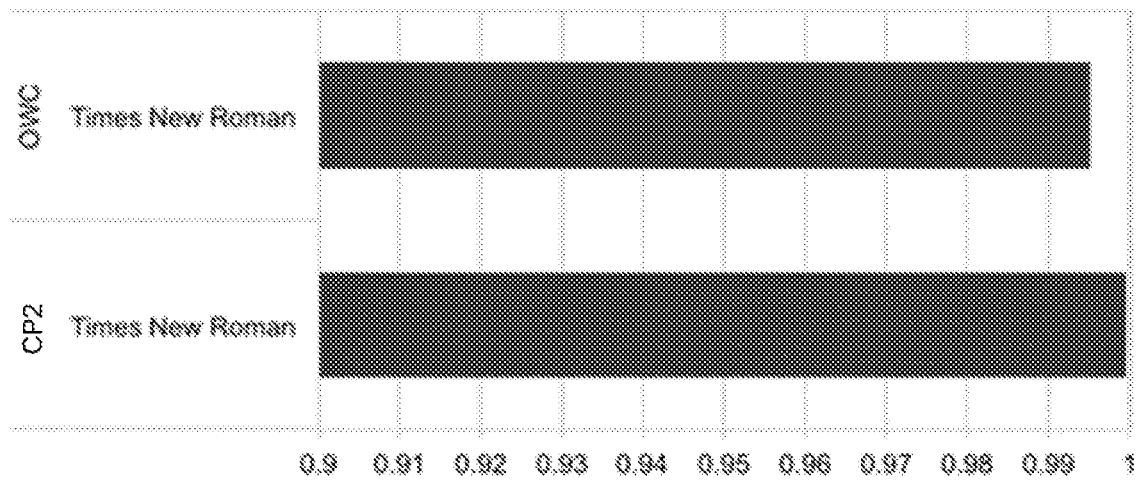
FIGS. 5A-5B shows results comparing OWC with another commercial product in English language.
Figure 5B:
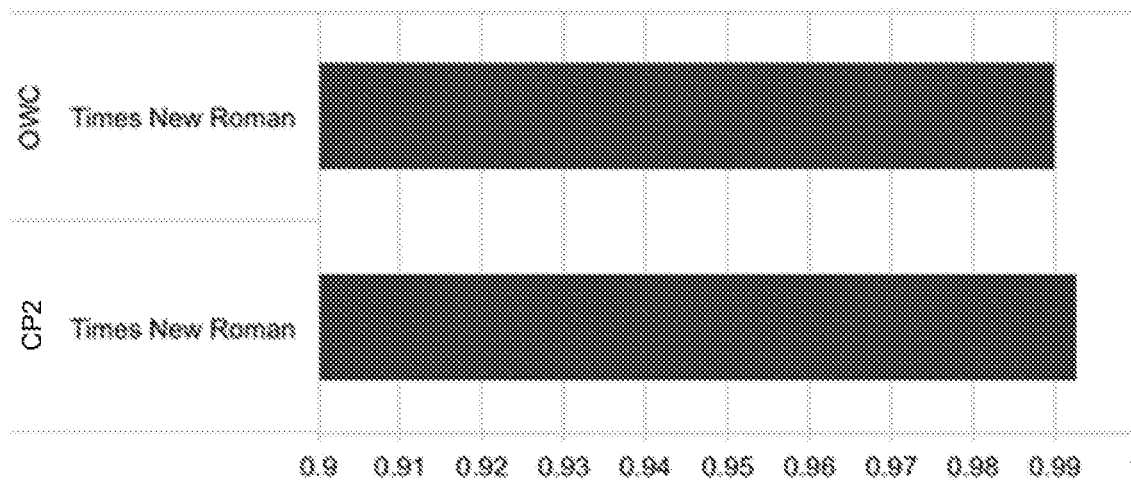

Results with English language: during the OWC prototyping effort, the focus was on script-based languages where the greatest quality gap would be found. English was used as a control language to demonstrate language independence. No effort was made to tune OWC to achieve good English results. A ten-page English test document was used to compare OWC and another commercial product (CP2) that is specialized in English image-to-text recognition. The text content was printed using the Times New Roman font. The same evaluation algorithm used for Pashto was used in this task. FIG. 5A shows results of the core (no punctuation) conversion task. FIG. 5B shows results of the standard (with punctuation) conversion task. Note that the scale is different than the scale used to depict Pashto results. Though the CP2 results are slightly better than the OWC results, for both ten-page tests, the results show that the OWC is also competitive with CP2 in English. This is true with and without punctuation. Again, both products lost a similar amount of accuracy when punctuation was included in the test text images. The comparisons above demonstrate that OWC has the capabilities in image-to-text conversions for both script-based language and English and that OWC produces reliable results for both types of languages.

Figure 6A:
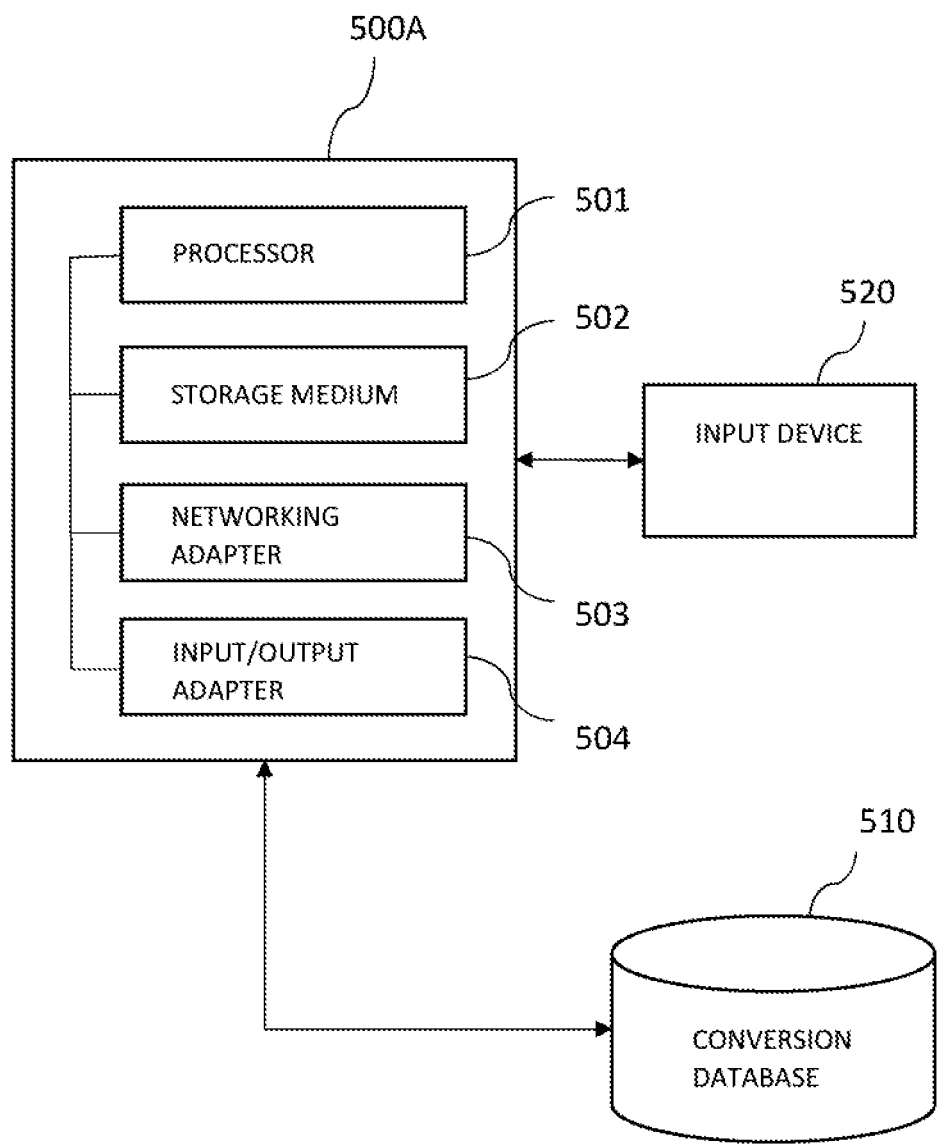
FIGS. 6A-6B shows diagrams for embodiments of systems for whole word conversion of text in an image.

With reference to FIG. 6A, shown is an embodiments of a system of the disclosed invention for whole word recognition of text in an image. The system 500A may convert the text in the images into Unicode strings. The system 500A may communicate with at least one conversion database 510 and one or more input devices 520. The conversion database 510 includes word templates, which represents words discovered in a language, and comparable features of the word templates. The word template for each word is represented in the database with a primary key that is Unicode string representation. The comparable features may include rendering vertical size, rendering horizontal size, pixel energy (black pixels) in the rendering image, pixel energy summed horizontally, pixel energy summed vertically.

The one or more input devices 520 may provide texts in images that are to be converted to or recognized as Unicode strings. The input devices 520 may include scanners, digital cameras, and any other image input devices that can supply images to the system 500A. The texts in images may be stored in an element such as storage medium in the system 500A, and may be processed to be converted to Unicode strings. However, when the input device 520 supplies images containing texts to the system 500A, the processes described referring FIG. 1A for whole word recognition of text in an image and conversion of the texts in the images into Unicode strings may be performed in real time.

The system 500A includes at least one processor 501, at least one storage medium 502, networking adapter 503, and input/output adapter 504 such as universal serial bus (USB) adapter and high-definition multimedia interface (HDMI) adapter. The system 500A may communicate with the conversion database 510 through the input/output adapter 504 or through networking adapter 503 wirelessly or through wires. The system 500A may communicate with the input device 520 through the input/output adapter 504 or through networking adapter 503 wirelessly or through wires. The at least one non-transitory storage medium 502 may be hard drives, flash drives or memories, and stores executable instructions for the whole word conversion of text in an image, and the at least one processor 501 executes the executable instructions that cause the at least one processor to perform operations to recognize the text in the image. The operations include performing line segmentation on texts in the image to identify clusters with each cluster sharing horizontal orientations, performing word segmentation on the identified clusters to produce word segments from the clusters, creating one or more comparable features of the word segments, performing whole word conversion of the word segments to matching word candidates based on the word segments, the comparable features of the word segments, and the word templates stored in the conversion database, constructing word confusion networks with the matching word candidates, and evaluating the word confusion networks to output matching words for the word segments.

Figure 6B:
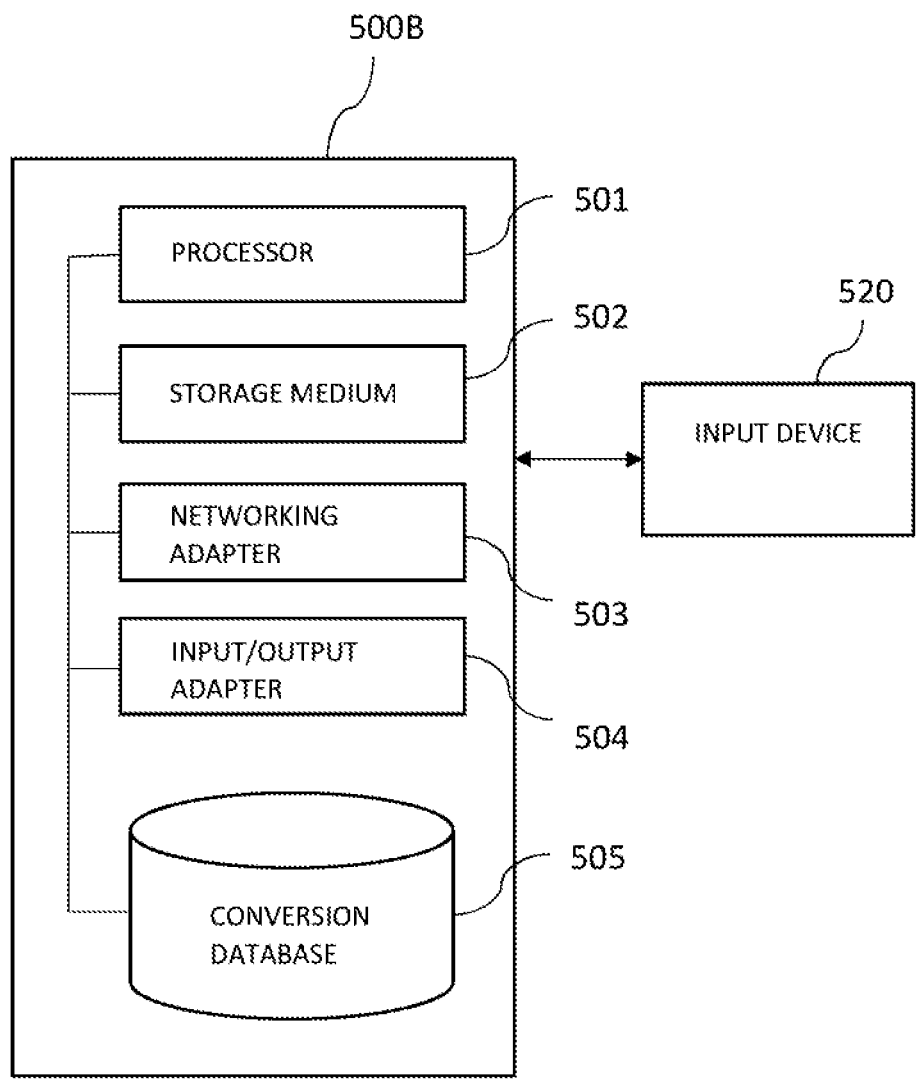

With reference to FIG. 6B, shown is another embodiment of a system of the disclosed invention for whole word recognition of text in an image. The system 500B may convert the texts in the images into Unicode strings. The system 500B includes at least one conversion database 505. The conversion database 505 includes word templates, which represents words discovered in a language, and comparable features of the word templates. The word template for each word is represented in the database with a primary key that is Unicode string representation. The comparable features may include rendering vertical size, rendering horizontal size, pixel energy (black pixels) in the rendering image, pixel energy summed horizontally, pixel energy summed vertically. The system 500B includes at least one processor 501, at least one storage medium 502, networking adapter 503, and input/output adapter 504. The functionalities of these elements of the system 500B are the same as those of the elements of the system 500A. One or more input devices 520 supply images containing texts to the system 500B. The system 500B may communicate with the input devices 520 through the networking adapter 503 or the input/output adapter 504.

The terms and descriptions used herein are set forth by way of illustration only and are not meant as limitations. Those skilled in the art will recognize that many variations are possible within the spirit and scope of the invention and the embodiments described herein.

What is claimed is:

1. A method for whole word conversion of text in an image, comprising:
    performing line segmentation on the text in the image to identify clusters with each cluster sharing horizontal orientations;
    performing word segmentation on the identified clusters to produce word segments from the clusters;
    creating one or more comparable features of the word segments;
    performing whole word conversion of the word segments to matching word candidates based on the word segments, the comparable features of the word segments, and word templates stored in a conversion database, wherein the performing whole word conversion comprises:
        setting one of the word segments as a target;
        comparing the comparable features of the target with comparable features of the word templates stored in the conversion database;
        filtering the word templates based on the comparison; and
        performing whole word image comparison with the filtered word templates;
    constructing word confusion networks with the matching word candidates; and
    evaluating the word confusion networks to output matching words for the word segments.

2. The method of claim 1 wherein the one or more comparable features include one or more selected from a group consisting of rendering vertical size, rendering horizontal size, pixel energy in the rendering image of a word segment, pixel energy summed horizontally, and pixel energy summed vertically.

3. The method of claim 1 wherein the one or more comparable features of the word segments are created by mirroring comparable features of the word templates stored in the conversion database.

4. The method of claim 1 wherein the performing whole word conversion comprises filtering the word templates to reduce a search space within the conversion database.

5. The method of claim 1 wherein the performing whole word image comparison comprises:
    placing the target and a template from the filtered word templates in mirror orientations to each other;
    normalizing the target and the template in size in a spatial domain;
    forward transforming the target and the template into frequency domain;
    generating a product by multiplying the forward transformed target and template in the frequency domain;
    inverse transforming the product back to the spatial domain; and
    analyzing the inverse transformed product in the spatial domain to determine correlation between the target and the template.

6. The method of claim 1 wherein the performing whole word conversion comprises evaluating the matching word candidates with scores, and the constructing word confusion networks comprises creating alternative paths with the matching word candidates that have the scores higher than a predetermined value.

7. The method of claim 1 wherein the matching word candidates are represented by Unicode strings.

8. The method of claim 1 wherein the database includes comparable features of the word templates, wherein the word templates represent words discovered in a language.

9. The method of claim 1, further comprising performing sub-word segmentation on the word segments to identify characters in the word segments.

10. The method of claim 1, further comprising constructing or updating the conversion database that includes word templates representing words discovered in a language, wherein the conversion database is constructed or updated by using a machine learning technique, and wherein comparable features of the word templates are created and stored in the conversion database.

11. A system for whole word conversion of text in an image, the system coupled to a conversion database that includes word templates and comparable features of the word templates, the word templates representing words discovered in a language, comprising:
at least one non-transitory storage medium to store executable instructions; and
at least one processor to execute the executable instructions that cause the at least one processor to perform operations comprising:
performing line segmentation on the text in the image to identify clusters with each cluster sharing horizontal orientations;
performing word segmentation on the identified clusters to produce word segments from the clusters;
creating one or more comparable features of the word segments;
performing whole word conversion of the word segments to matching word candidates based on the word segments, the comparable features of the word segments, and the word templates stored in the conversion database, wherein the performing whole word conversion comprises:
setting one of the word segments as a target;
comparing the comparable features of the target with comparable features of the word templates stored in the conversion database;
filtering the word templates based on the comparison; and
performing whole word image comparison with the filtered word templates;
constructing word confusion networks with the matching word candidates; and
evaluating the word confusion networks to output matching words for the word segments.

12. The system of claim 11 wherein the one or more comparable features include one or more selected from a group consisting of rendering vertical size, rendering horizontal size, pixel energy in the rendering image of a word segment, pixel energy summed horizontally, and pixel energy summed vertically.

13. The system of claim 11 wherein the one or more comparable features of the word segments are created by mirroring comparable features of the word templates stored in the conversion database.

14. The system of claim 11 wherein the performing whole word conversion comprises filtering the word templates to reduce a search space within the conversion database.

15. The system of claim 11 wherein the performing whole word image comparison comprises:
placing the target and a template from the filtered word templates in mirror orientations to each other;
normalizing the target and the template in size in a spatial domain;
forward transforming the target and the template into frequency domain;
generating a product by multiplying the forward transformed target and template in the frequency domain;
inverse transforming the product back to the spatial domain; and
analyzing the inverse transformed product in the spatial domain to determine correlation between the target and the template.

16. The system of claim 11 wherein the performing whole word conversion comprises evaluating the matching word candidates with scores, and the constructing word confusion networks comprises creating alternative paths with the matching word candidates that have the scores higher than a predetermined value.

17. The system of claim 11, wherein the matching word candidates are represented by Unicode strings.

18. The system of claim 11, wherein the operations further comprises performing sub-word segmentation on the word segments to identify characters in the word segments.

* * * * *